United States Patent [19]

Anderson

[11] Patent Number: 4,909,659

[45] Date of Patent: Mar. 20, 1990

[54] INTERLOCKING STRUCTURAL MEMBERS EMPLOYING TRANSVERSE LOCKING MEANS

[75] Inventor: Robert E. Anderson, Huntington Station, N.Y.

[73] Assignee: Grumman Aerospace Corporation, Bethpage, N.Y.

[21] Appl. No.: 306,199

[22] Filed: Feb. 6, 1989

[51] Int. Cl.$^4$ .................................................. F16B 1/00
[52] U.S. Cl. ..................................... 403/376; 244/123; 244/132; 29/513; 403/364; 403/374; 403/256
[58] Field of Search ..................... 403/256, 254, 409.1, 403/374, 252, 279, 274, 282, 376, 364; 244/132, 123; 29/513

[56] References Cited

U.S. PATENT DOCUMENTS

| | | | |
|---|---|---|---|
| 251,094 | 12/1881 | Carr | 403/256 |
| 254,842 | 3/1882 | Pflug | 403/282 |
| 2,375,951 | 5/1945 | Simon | 244/132 |
| 3,995,080 | 11/1976 | Cogburn et al. | 244/123 |
| 4,331,495 | 5/1982 | Lackman et al. | 2144/132 |
| 4,395,450 | 7/1983 | Whitener | 244/123 |
| 4,786,343 | 11/1988 | Hertzberg | 244/123 |
| 4,811,540 | 3/1989 | Kallies et al. | 244/123 |

*Primary Examiner*—Andrew V. Kundrat
*Assistant Examiner*—Carol I. Bordas
*Attorney, Agent, or Firm*—Pollock, Vande Sande & Priddy

[57] ABSTRACT

A wing skin is usually mounted to a support structure by using metal fasteners which cause high stress points and potential leakage points. The invention utilizes projections formed in a wing skin to mate with recesses formed in a support substructure which, when positioned together, form interdigitations which prevent sliding displacement of the wing skin. A plurality of sliding bars transversely pass through the interdigitating sections to maintain an interlocking relation. The transversely oriented bars enable the use of the invention with contoured wing skin structures.

6 Claims, 3 Drawing Sheets

INTERLOCKING STRUCTURAL MEMBERS EMPLOYING TRANSVERSE LOCKING MEANS

FIELD OF THE INVENTION

The present invention relates to a fastenerless joint, and more particularly to such a joint for composite aircraft structures.

BRIEF DESCRIPTION OF THE PRIOR ART

In many fabrication applications laminated structures are attached to support structures by common fastening techniques. In one particular application, composite laminated aircraft wing skins are attached to a support substructure by means of rivets. Within the aircraft environment this creates several problems. In the first place, the rivets passing through the various plies of the laminated structures create stress forces which could cause rupture and ultimate destruction of the aircraft.

In modern fabrication techniques for composite aircraft skins, fuel or other liquids are often contained within the skin so that the aircraft structure itself creates a reservoir for the fluid. A serious problem with current construction techniques utilizing fasteners is the presence of leaks where rivets penetrate the composite laminate.

For these and other reasons, it would be highly desirable to create a mechanical joint between aircraft composite laminated skin structures and support subassemblies without the utilization of discrete fasteners.

BRIEF DESCRIPTION OF THE INVENTION

The present invention utilizes mechanically interleaved plies of a composite laminate wing skin structure which enforces the normal bonding between plies of the laminate.

Hollowed projections are formed in rows from the wing skin laminate and these receive mating recesses in a composite wing substructure so that interdigitation of the wing skin structure and support substructure results. The interdigitating members are hollow so that a plurality of transversely positioned bars, which may be fabricated from the composite laminate, may be slid through the interdigitating members thereby locking the members together and strongly resisting delamination which often occurs along a plane between the wing skin structure and the support substructure of conventional assemblies.

Further advantages of the present invention relate to automated precut material use which lends itself to rapid repeatable production and reduction of layup time. The tooling required is relatively uncomplicated, which serves as a distinctive economic advantage of the invention.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
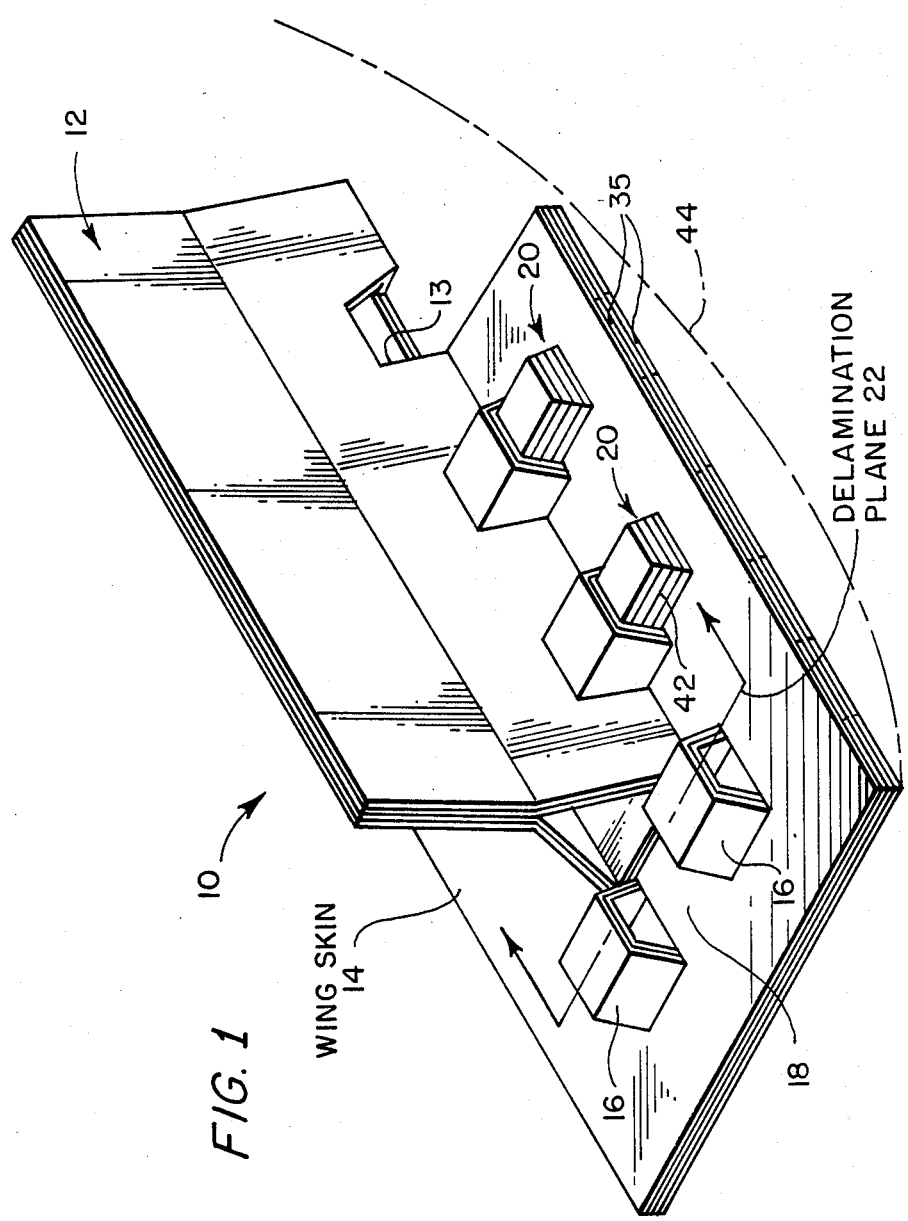
FIG. 1 is a perspective view illustrating interlocking engagement between a wing skin structure and support substructure in accordance with the present invention.

Reference is made to FIG. 1 wherein interlocking engagement between a wing skin structure and support substructure is illustrated. The interlocking members are generally indicated by reference numeral 10 and are seen to include a wing support substructure 12 secured to a wing skin structure 14. In order to achieve the interlocking engagement between members 12 and 14, trapezoidal projections 16 are formed in the wing skin structure 14 and for illustrative purposes are indicated as two parallel spaced rows extending longitudinally. A greater number of rows could, of course, be present. The wing support substructure 12 has, along a triangular base portion, slots 13 formed therein so that the spacing between the recesses is the same as the spacing between longitudinally extending adjacent projections. The slots 13 receive corresponding trapezoidal projections 16 so that the engaging portions form interdigitations. The triangular base portion of the substructure 12 and the trapezoidal projections 16 are hollowed so that a transversely positioned bar 20 can slide through transversely aligned projections to secure interlocking engagement between the substructure 12 and the projections 16. If the wing skin structure 14 and the wing support substructure 12 were connected in conventional fashion by rivets, a delamination plane would exist at the interface between wing skin structure and support substructure, as indicated by reference numeral 22. When rivet construction is used, a danger exists that sufficient stress upon the wing skin structure will delaminate or separate the wing skin structure 14 from the wing support substructure 12. The transverse orientation of the bars 20 along the longitudinal interface between wing skin structure 14 and wing support substructure 12 greatly increases an aircraft's ability to resist delamination.

It is to be noted that the wing support substructure 12 is shown mounted in longitudinal offset relationship to the wing skin substructure 14 so that details of the invention are better illustrated. In actual utilization of the invention, the substructure 12 would be shifted to more completely overlie the wing skin structure 14.

Figure 2:
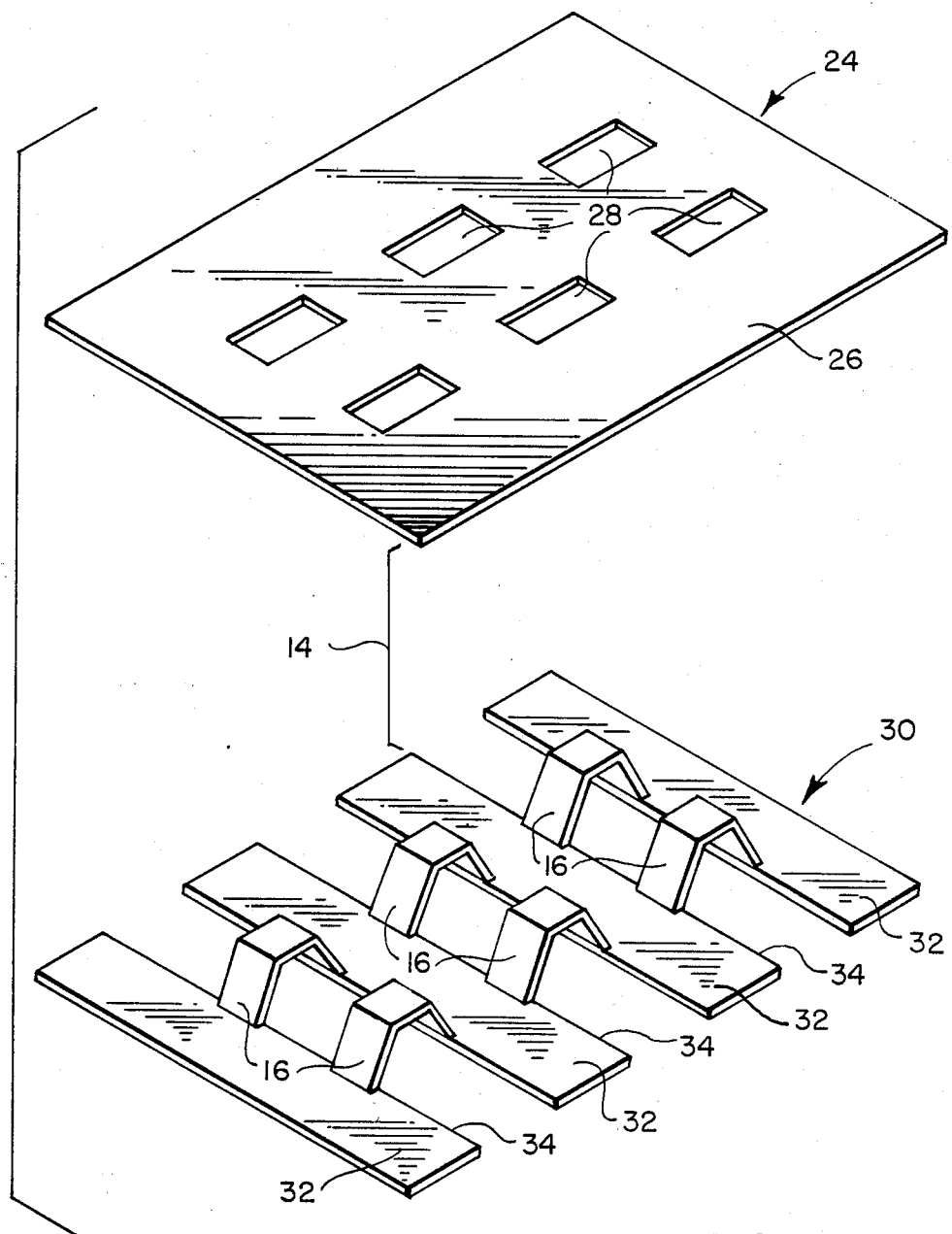
FIG. 2 is a disassembled view of top and bottom ply members constituting an elementary wing skin structure.

In order to better appreciate the construction of the present invention, reference is made to FIG. 2 wherein a top ply for the wing skin structure is generally indicated by reference numeral 24. The ply may be fabricated from a Fiberglas sheet 26 or from a number of conventional composite materials. For simplicity of explaining the invention, only six spaced openings 28 are illustrated. These openings appear as two longitudinally extending parallel spaced rows, each row having two transversely aligned openings of parallelepiped shape. A bottom ply 30 is fabricated from a sheet 32 of appropriate material such as Fiberglass or selected composite material. The sheet 32 is interrupted by longitudinal medial openings 34 interrupted by integrally formed connecting trapezoidal projections 16 which, in the illustrated example, appear as pairs bridging each of the medial openings 34 and spaced to be in registry with corresponding openings 28.

Figure 3:
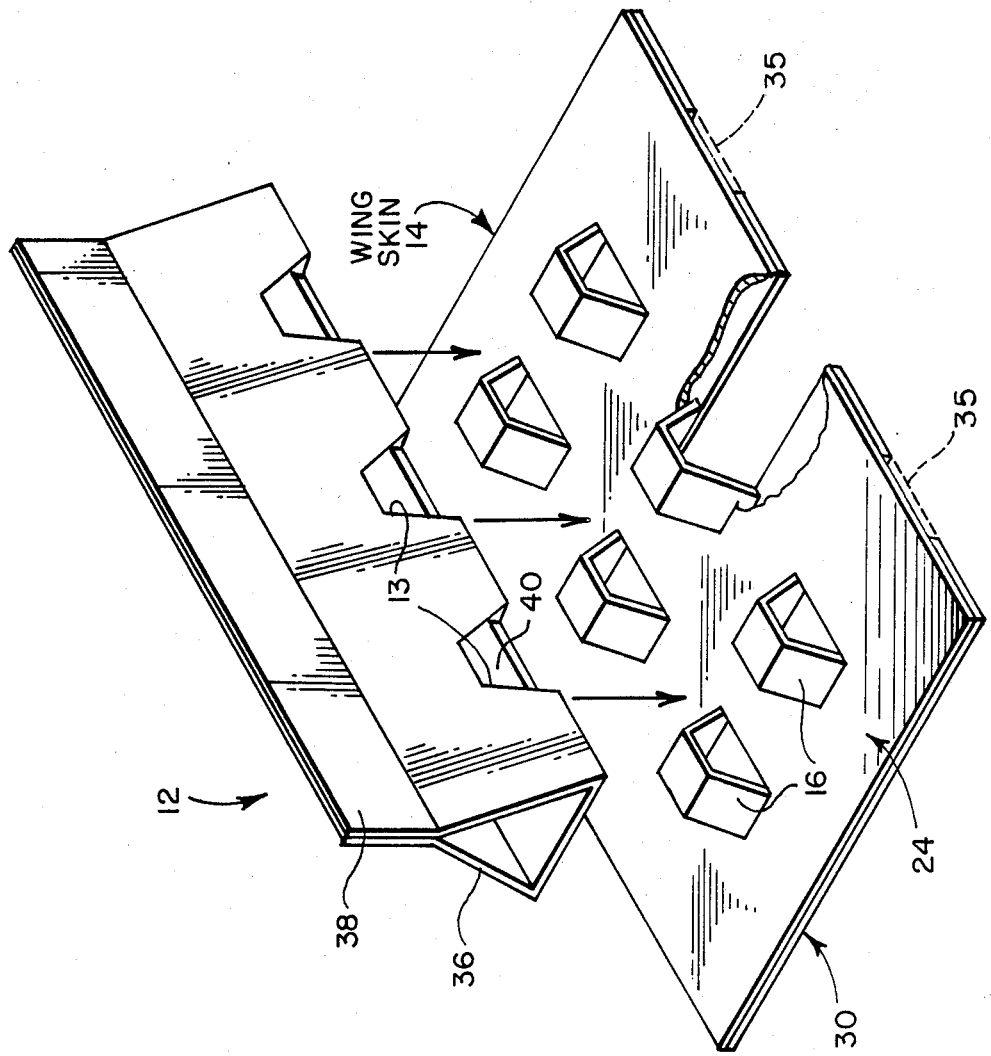
FIG. 3 is a disassembled view of a wing skin structure and support substructure in accordance with the present invention.

By lowering the top ply 24 over the bottom ply 30 so that projections 16 respectively project upwardly through corresponding openings 28, the two plies become geometrically locked, as indicated by the completed wing skin structure 14 in FIG. 3. As is the case in existing composite aircraft laminated structures, the individual plies are impregnated with resin and cured. Conventional pre-impregnated resins may be successfully used in accordance with known practices.

It should be observed that FIGS. 2 and 3 illustrate the wing skin structure as being fabricated from a single top and bottom layer. However, this has been done to simplify the explanation of the invention. In order to achieve desired structural strength, it is anticipated that several sets of top and bottom layers will be necessary. Accordingly, FIG. 1 has been illustrated for an example where two sets of top and bottom plies have been employed. Further referring to FIG. 1, each bar 20 may be fabricated from laminated plies 42 or, alternatively, may take the form of a single solid bar.

If the wing skin is desired to be of uniform thickness, strips 35 are positioned in the medial openings 34, as indicated in FIGS. 1 and 3.

The final construction of the invention will now be explained in connection with FIG. 3. The wing support substructure 12 is shown as fabricated from two plies of resin-impregnated fabric which, like the wing skin structure, may be made of Fiberglass or other suitable composite, the layers being folded over one another to form the flat portion 38. The lower portion of the wing support structure is formed as a closed, hollowed triangular portion, indicated by reference numeral 36.

In order to fabricate the composite wing skin structure and composite wing support substructure as rigid load-supportable members, the resin impregnation of the composite fabrics must be cured. In this regard the wing skin structure 14 may be cured separately from the support substructure 12 and then assembled. Alternatively, the wing skin structure 14 may be connected to the support substructure 12 while both are still wet. Then, they may be co-cured while a mandrel (not shown) is located within each of the projections prior to insertion of the bars 20. After co-curing the mandrel may be removed; and bars 20, separately cured, are passed through their respective trapezoidal projections 16.

In order to increase the substructure's resistance to shear forces, a strip of material may be laced through the flat portion 38 in a manner detailed in my co-pending application Ser. No. 53,199 filed May 22, 1987.

In a finally assembled aircraft, the wing support substructure 12 and trapezoidal projections 16 are positioned internally of the wing. The underside of the wing skin structure 14, opposite the surface illustrated, will form the exterior surface of the wing skin. The utilization of transverse locking means, namely the bars 20 within projections 16, offer the capability of securely fastening the wing support 12 to the wing skin 14 even in the event that the wing skin 14 should have a contour, such as indicated by 44, instead of the planar appearance as indicated in the figure. A further distinctive advantage of the transversely located locking means is the fact that rotational (hinge) rotation of the wing skin 14, relative to the wing support 12, is minimized.

Although the present invention has been explained in connection with trapezoidal projection 16 and a triangular-based wing support substructure 12, this has been done to simplify the explanation and is only illustrative. Other mating shapes may be similarly employed.

As will be appreciated by virtue of the connection of wing skin structure 14 to wing support substructure 12, without the aid of rivets, high stress points and leakage points between the two structures are eliminated.

Although the present invention has been described in terms of a fastenerless joint for securing an aircraft wing skin to a support structure, it should be appreciated that the invention contemplates other applications. Thus, the following claims envision general utilization of projections from a first laminated structure to form interdigitations with a support substructure to achieve a secure joint therebetween. Specifically, the present invention is envisioned for applications to securing other aircraft skin sections to support substructures, in addition to a wing skin as discussed herein.

It should be understood that the invention is not limited to the exact details of construction shown and described herein, for obvious modifications will occur to persons skilled in the art.

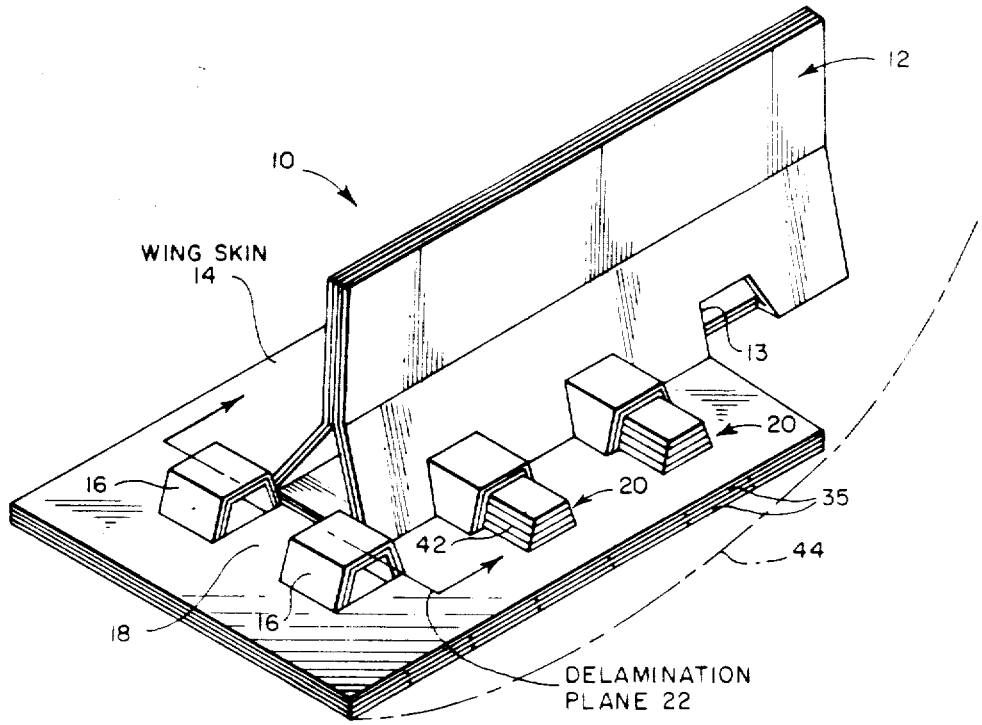

I claim:

1. A joint for interlocking first and second structural members, the joint comprising:
    (a) a first structural laminate member including
        (i) at least one top ply having a plurality of parallel rows of spaced openings formed therein, correspondingly positioned openings in the rows being transversely aligned relative to the longitudinal direction of the rows;
        (ii) at least one bottom ply having projections extending therefrom, the projections characterized by open cross sections and arranged in aligned rows to correspond with the openings;
    (b) a second structural member including an elongated base portion having an open cross section and spaced recesses therealong which receive corresponding projections of the first member thereby forming interdigital engagement therebetween; and
    (c) a plurality of bars positioned transversely of the second structural member, and received within the interdigitating projections and recesses for securing engagement of the first and second structural members.

2. The structure set forth in claim 1 wherein the first structural member is formed from a plurality of bonded alternating top and bottom plies.

3. The structure set forth in claim 1 wherein the second structural member is a laminate fabricated from a plurality of bonded layers.

4. A joint for interlocking first and second structural members comprising:
    (a) a first structural laminate member having a plurality of alternating bonded first and second plies, the member more particularly including
        (i) first plies having a plurality of parallel rows of spaced openings formed therealong, correspondingly positioned openings in the rows being transversely aligned relative to the longitudinal direction of the rows;
        (ii) second plies each having projections extending therefrom, the projections characterized by an open cross section and arranged in rows aligned with the openings;
    (b) a second structural laminate member having a plurality of bonded plies and including an elongated base portion having an open cross section and spaced recesses therealong which receive corresponding projections of the first member thereby forming interdigital engagement therebetween; and
    (c) a plurality of laminate bars, formed from a plurality of bonded plies, positioned transversely of the second structural member, and received within the interdigitating projections and recesses for securing engagement of the first and second structural members.

5. The method of forming a joint which interlocks first and second structural members, the method comprising the steps:
   (a) forming a plurality of parallel rows of spaced openings in first plies of a first structural member;
   (b) forming spaced integral projections of open cross section in second plies of the first structural member and arranged in aligned rows to correspond with the openings;
   (c) alternately positioning first plies on the second plies to form a laminated first structural member wherein the projections of the second plies become stacked and pass through correspondingly aligned openings in the first plies;
   (d) forming a second structural laminate member to include an elongated base portion having an open cross section and spaced recesses therealong;
   (e) positioning the second structural member in engagement with the first structural member wherein the recesses of the second structural member receive corresponding projections of the first member and interdigitation results therebetween; and
   (f) passing a plurality of bars through the recesses and projections in a direction transverse to the second structural member to secure the members together.

6. The method set forth in claim 5 wherein each bar is fabricated as a laminate.

* * * * *

UNITED STATES PATENT AND TRADEMARK OFFICE
CERTIFICATE OF CORRECTION

PATENT NO. : 4,909,659

DATED : March 20, 1990

INVENTOR(S) : Robert E. Anderson

It is certified that error appears in the above-identified patent and that said Letters Patent is hereby corrected as shown below:

The title page showing the illustrative figure should be deleted to appear as per the attached title page.

Column 2, line 52, change "Fiberglas" to --Fiberglass--.

Column 3, line 60, change "rotational (hinge) rotation" to --hinge rotation--.

Signed and Sealed this

First Day of October, 1991

Attest:

HARRY F. MANBECK, JR.

Attesting Officer

Commissioner of Patents and Trademarks

United States Patent [19]

Anderson

[11] Patent Number: 4,909,659
[45] Date of Patent: Mar. 20, 1990

[54] INTERLOCKING STRUCTURAL MEMBERS EMPLOYING TRANSVERSE LOCKING MEANS

[75] Inventor: Robert E. Anderson, Huntington Station, N.Y.

[73] Assignee: Grumman Aerospace Corporation, Bethpage, N.Y.

[21] Appl. No.: 306,199

[22] Filed: Feb. 6, 1989

[51] Int. Cl.⁴ ............................................. F16B 1/00
[52] U.S. Cl. ............................ 403/376; 244/123; 244/132; 29/513; 403/364; 403/374; 403/256
[58] Field of Search .................. 403/256, 254, 409.1, 403/374, 252, 279, 274, 282, 376, 364; 244/132, 123; 29/513

[56] References Cited
U.S. PATENT DOCUMENTS

| 251,094 | 12/1881 | Carr | 403/256 |
|---|---|---|---|
| 254,842 | 3/1882 | Pflug | 403/282 |
| 2,375,951 | 5/1945 | Simon | 244/132 |
| 3,995,080 | 11/1976 | Cogburn et al. | 244/123 |
| 4,331,495 | 5/1982 | Lackman et al. | 2144/132 |
| 4,395,450 | 7/1983 | Whitener | 244/123 |
| 4,786,343 | 11/1988 | Hertzberg | 244/123 |
| 4,811,540 | 3/1989 | Kallies et al. | 244/123 |

*Primary Examiner*—Andrew V. Kundrat
*Assistant Examiner*—Carol I. Bordas
*Attorney, Agent, or Firm*—Pollock, Vande Sande & Priddy

[57] ABSTRACT

A wing skin is usually mounted to a support structure by using metal fasteners which cause high stress points and potential leakage points. The invention utilizes projections formed in a wing skin to mate with recesses formed in a support substructure which, when positioned together, form interdigitations which prevent sliding displacement of the wing skin. A plurality of sliding bars transversely pass through the interdigitating sections to maintain an interlocking relation. The transversely oriented bars enable the use of the invention with contoured wing skin structures.

6 Claims, 3 Drawing Sheets